United States Patent
Lee et al.

(10) Patent No.: US 8,120,262 B2
(45) Date of Patent: Feb. 21, 2012

(54) DRIVING CIRCUIT FOR MULTI-LAMPS

(75) Inventors: Steve Lee, Taipei (TW); John Wang, Shenzhen (CN); Xuefang Yang, Shanghai (CN)

(73) Assignee: O2Micro Inc, Santa Clara, CA (US)

( * ) Notice: Subject to any disclaimer, the term of this patent is extended or adjusted under 35 U.S.C. 154(b) by 404 days.

(21) Appl. No.: 11/983,636

(22) Filed: Nov. 8, 2007

(65) Prior Publication Data

US 2008/0111496 A1    May 15, 2008

Related U.S. Application Data

(60) Provisional application No. 60/858,029, filed on Nov. 9, 2006.

(51) Int. Cl.
*H05B 37/00* (2006.01)
(52) U.S. Cl. ............. 315/177; 315/185 R; 315/220
(58) Field of Classification Search .......... 315/177, 315/185 R, 186, 189, 192, 209 R, 210, 219, 315/220, 224, 246, 250, 254, 255, 256, 257, 315/258, 276, 277, 278, 279, 282, 283, 287, 315/291, 299, 300, 301, 307, 308, 312, 326, 315/362, 361
See application file for complete search history.

(56) References Cited

U.S. PATENT DOCUMENTS

| | | | | |
|---|---|---|---|---|
| 6,717,371 B2 * | 4/2004 | Klier et al. | | 315/274 |
| 6,781,325 B2 * | 8/2004 | Lee | | 315/282 |
| 7,166,969 B2 * | 1/2007 | Kohno | | 315/209 PZ |
| 7,667,410 B2 * | 2/2010 | Kim et al. | | 315/274 |
| 2005/0093484 A1 * | 5/2005 | Ball | | 315/291 |
| 2008/0067944 A1 * | 3/2008 | Wang et al. | | 315/185 R |
| 2008/0067951 A1 * | 3/2008 | Hsu et al. | | 315/277 |

* cited by examiner

*Primary Examiner* — Douglas W Owens
*Assistant Examiner* — Jianzi Chen

(57) ABSTRACT

A circuit is used for driving a plurality of lamps, such as Cold Cathode Fluorescent Lamps (CCFLs). The lamps are paired to form a plurality of pairs of lamps. Each of the plurality of pairs of lamps has two lamps which are coupled to each other in series. The plurality of pairs of lamps are coupled in parallel. The circuit comprises a switch circuit, a transformer, and a plurality of balance chokes. The switch circuit is used for converting a DC electric power into a first AC electric power. The transformer has a primary winding and a secondary winding. The primary winding of the transformer is coupled to the switch circuit for receiving said first AC electric power and energizing the secondary winding to generate a second AC electric power from the secondary winding to energize the plurality of lamps. Each of the balance chokes includes a first winding and a second winding. The first winding and the second winding of each of the balance chokes are coupled to two of the plurality of pairs of lamps in series, respectively, so as to balance currents flowing through those two pairs of lamps.

19 Claims, 6 Drawing Sheets

DRIVING CIRCUIT FOR MULTI-LAMPS

CROSS REFERENCE TO PROVISIONAL APPLICATION

This application claims priority to the co-pending provisional patent application Ser. No. 60/858,029, entitled "Driving Circuit For Multi-Lamps" with filing date Nov. 9, 2006, and assigned to the assignee of the present invention, which is herein incorporated by reference in its entirety.

TECHNICAL FIELD

The present invention relates to a driving circuit, and more particularly, to a circuit for driving lamps.

BACKGROUND ART

Liquid crystal display (LCD) panels are used in various applications ranging from portable electronic device to fixed location units, such as laptops, video cameras, mobile phones, PDAs, game machines, medical instruments, automobile navigation systems, and industrial machines. In LCD applications, usually backlighting is needed to illuminate the panel. Typically, LCD backlighting is used to provide high brightness, long lifetime and good uniformity features. There are many types of LCD backlighting sources, such as Electroluminescent Lamp (EL), Light Emitting Diode (LED), Cold Cathode Fluorescent Lamp (CCFL), Flat Fluorescent Lamp (FFL), External Electrode Fluorescent Lamp (EEFL), Hot Cathode Fluorescent Lamp (HCFL), and Carbon Nano Tube (CNT).

CCFL backlighting is commonly used in graphics and color displays, and is well suited for use in large and middle scale LCD panels. Moreover, CCFL can be used as the illumination source for LCD panels, and may be composed of a phosphor coated glass cylinder with cathodes at either end. Further, with the increasing size of LCD panels, e.g., in LCD televisions or large-size LCD monitors, backlighting systems may operate with multiple CCFLs to provide the necessary illumination.

A high voltage Direct Current/Alternating Current (DC/AC) converter (known as an inverter) is usually required to drive the CCFL. Most CCFL DC/AC converters may be formed as tuned switch circuits designed to produce an output AC power with a specific voltage and frequency. A typical CCFL inverter needs to output about 20~80 kHz AC, with an operating voltage of about 400~800 V RMS (Root Mean Square). Moreover, with the advent of large LCD panels where many CCFLs are needed, suitable approaches for driving multi-lamps are necessary. For multiple lamps, the DC/AC converter (inverter) drives multiple CCFLs usually in parallel. For example, referring to PRIOR ART FIG. 1, a conventional driving circuit 100 is illustrated. The driving circuit 100 is used to drive four CCFLs 142, 144, 146 and 148, and comprises a switch circuit 110 and two transformers 114 and 116. The transformers 114 and 116 have primary windings and secondary windings, respectively. The switch circuit 110 is used to convert an external DC electric power from a DC electric power source 112 into a first AC electric power, and to deliver the first AC electric power to the primary windings of the transformers 114 and 116. The secondary windings of the transformers 114 and 116 are coupled to the CCFLs 142 and 144 and the CCFLs 146 and 148, respectively, for energizing the CCFLs 142, 144, 146 and 148. Here, the transformers 114 and 116 are used to boost the first AC electric power with a relatively low voltage level to a second AC electric power with a high voltage level so as to meet the requirement for driving the CCFLs 142, 144, 146 and 148. Capacitors 118 and 120 are also coupled to the secondary windings of the transformers 114 and 116 in parallel, respectively.

Referring to PRIOR ART FIG. 2, another conventional driving circuit 200 is illustrated. The driving circuit 200 is used to drive a plurality of CCFLs 242, 244, and 246, and comprises a switch circuit 210 and a plurality of transformers 214, 216, and 218. The transformers 214, 216, and 218 have primary windings and secondary windings, respectively. The switch circuit 210 is coupled to the primary windings of the transformers 214, 216, and 218. The switch circuit 210 is used to convert an external DC electric power from a DC electric power source 212 into a first AC electric power, and to deliver the first AC electric power to the primary windings of the transformers 214, 216, and 218. The secondary windings of the transformers 214, 216, and 218 are coupled to the CCFLs 242, 244, and 246, respectively, for energizing the CCFLs 242, 244, and 246. Capacitors 222, 224 and 226 are also coupled to the secondary windings of the transformers 214, 216, and 218, respectively.

Those configurations have the well-known problem that the CCFL currents may not be balanced, owing to the lamp voltage variation and the load characteristics of the CCFL, as well as the differences in the CCFL impedances and temperature variation. The imbalance of the CCFL currents causes a reduced lifetime and non-uniformity of brightness.

SUMMARY OF THE INVENTION

It is an object of the present invention to provide a circuit or method for driving multiple backlight lamps with balanced current, low cost, high efficiency, and current monitoring function.

In order to achieve the above object, the present invention provides a circuit for driving a plurality of lamps, such as Cold Cathode Fluorescent Lamps (CCFLs). The lamps are paired to form a plurality of pairs of lamps. Each of the plurality of pairs of lamps comprises two lamps which are coupled to each other in series. The plurality of pairs of lamps are coupled in parallel. The circuit comprises a switch circuit, a transformer, and a plurality of balance chokes. The switch circuit is used for converting a DC electric power into a first AC electric power. The transformer has a primary winding and a secondary winding. The primary winding of the transformer is coupled to the switch circuit for receiving said first AC electric power and energizing the secondary winding to generate a second AC electric power from the secondary winding to energize the plurality of lamps. Each of the balance chokes includes a first winding and a second winding. The first winding and the second winding of each of the balance chokes are coupled to two of the plurality of pairs of lamps in series, respectively, so as to balance currents flowing through those two pairs of lamps.

BRIEF DESCRIPTION OF THE DRAWINGS

Other objects, advantages, and novel features of the invention will become more apparent from the following Detailed Description when taken in conjunction with the accompanying drawing.

PRIOR ART

PRIOR ART

DESCRIPTION OF THE EMBODIMENT

Reference will now be made in detail to the embodiments of the present invention, driving circuit for multi-lamps. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 3:
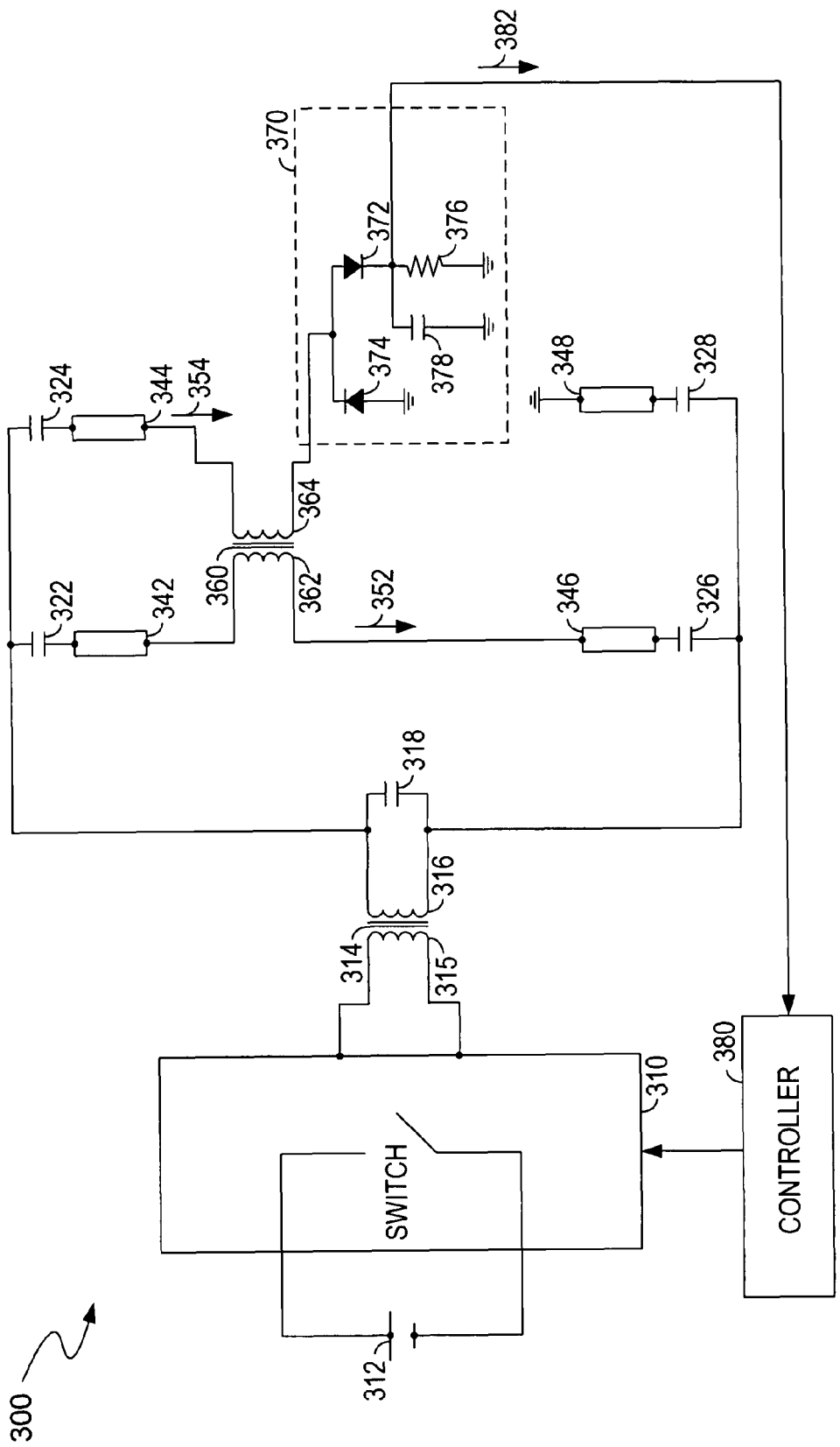
FIG. 3 is a diagram showing a driving circuit for driving four CCFLs, in accordance with one embodiment of the present invention.

Referring to FIG. 3, a driving circuit 300 according to one embodiment of the present invention is illustrated. The driving circuit 300 is used to drive four cold cathode fluorescent lamps (CCFLs) 342, 344, 346, and 348. The driving circuit 300 comprises a switch circuit 310 coupled to an external Direct Current (DC) electric power source, such as a battery 312. The switch circuit 310 serves as a DC/AC converter or an inverter and is used for converting a DC electric power from the battery 312 into a first Alternating Current (AC) electric power. The first AC electric power is delivered to a primary winding 315 of a transformer 314 to induce a secondary winding 316 of the transformer 314 to output a second AC electric power.

The switch circuit 310 comprises a plurality of switches, such as MOSFETs or other transistor types, and can be formed as varied circuits, such as a Royer, a full-bridge, a half-bridge, or a push-pull inverter circuit architecture.

For example, according to one embodiment of the present invention, the switch circuit 310 may be formed as a full-bridge inverter circuit, where the switch circuit 310 comprises two pairs of MOSFETs (not shown). Each pair of MOSFETs comprises two MOSFETs that may be coupled to each other in series. Moreover, two pairs of MOSFETs may be coupled to each other in parallel. In this embodiment, two ends of the primary winding 315 of the transformer 314 may be coupled to the two pairs of MOSFETs, respectively, so as to receive the first AC electric power from the switch circuit 310.

In another embodiment, the switch circuit 310 may be formed as a half-bridge inverter circuit. In this embodiment, the switch circuit 310 comprises two MOSFETs coupled to each other in series. In this embodiment, the two ends of the primary winding 315 of the transformer 314 may be coupled to the two MOSFETs and ground, respectively, so as to receive the first AC electric power from the switch circuit 310.

Furthermore, according to one embodiment of the present invention, the switch circuit 310 may be formed as a Royer inverter circuit. The switch circuit 310 comprises two transistors. It should be understood by those skilled in the art that, in this embodiment, the primary winding 315 of the transformer 314 comprises three input ends, not shown in FIG. 3. In this embodiment, the two ends of the primary winding 315 may be coupled to the transistors. Moreover, one end of the primary winding 315 may be coupled to the DC electric power source 312 for delivering the DC electric power to the middle of the primary winding 315.

In still another embodiment, the switch circuit 310 may be formed as a push-pull inverter circuit. The switch circuit 310 comprises two MOSFETs. It should be understood by those skilled in the art that, in this embodiment, the primary winding 315 of the transformer 314 comprises three input ends, not shown in FIG. 3. In this embodiment, the two ends of the primary winding 315 may be coupled to the MOSFETs. Moreover, one end of the primary winding 315 may be coupled to the DC electric power source 312 for delivering the DC electric power to the middle of the primary winding 315.

In order to drive the CCFLs 342, 344, 346 and 348, a suitable AC electric power with high voltage and high frequency needs to be provided. For example, the starting voltage for igniting the CCFLs 342, 344, 346 and 348 exceeds about 1,000 volts RMS, the operating voltage is generally between about 400 and about 800 volts RMS, and the frequency is generally about 20~80 kHz.

In accordance with one embodiment of the present invention, the first AC electric power output from the switch circuit 310 is at a relatively low voltage level. The transformer 314 is used to boost the first AC electric power to output the second AC electric power with a high voltage level, which is required for driving the CCFLs 342, 344, 346 and 348. It is apparent to those skilled in the art that the voltage across the secondary winding 316 is proportional to the ratio of turns of the secondary winding 316 to turns of the primary winding 315 times the voltage across the primary winding 315. In other words, the second AC electric power with the high voltage level is generated according to a high ratio of turns. The secondary winding 316 of the transformer 314 is coupled to the CCFLs 342, 344, 346 and 348 to energize them.

As shown in FIG. 3, a capacitor 318 is coupled with the second winding 316 of the transformer 314 in parallel for filtering noises in the CCFLs 342, 344, 346, and 348. Four capacitors 322, 324, 326 and 328, for example, 15 pf-39 pf, are coupled to the CCFLs 342, 344, 346 and 348 in series, respectively. The current during the transition period from the starting voltage to the operating voltage in this driving circuit 300 is implemented or stabilized by the capacitors 322, 324, 326 and 328. The capacitors 322, 324, 326 and 328 serve as ballasts to provide impedance. The capacitances of the capacitors 322, 324, 326 and 328 may become fairly high impedances during the transition period so as to keep energizing the CCFLs 342, 344, 346, and 348.

Referring to FIG. 3, the CCFLs 342 and 346 are coupled with each other in series to form a first branch 352. Further; the CCFLs 344 and 348 both are coupled to ground, and are coupled with each other in series to form a second branch 354. A balance choke 360 comprises a first winding 362 coupled serially to the first branch 352 and a second winding 364 coupled serially to the second branch 354 to balance the current flowing through the first branch 352 and the current flowing through the second branch 354. Specifically, for example, in the second branch 354, current may flow through the CCFL 344 and the second winding 364 of the balance choke 360 from the secondary winding 316 of the transformer 314 to ground, and through the CCFL 348 from ground to the secondary winding 316 of the transformer 314. In the first branch 352, current may flow through the CCFLs 342 and 346 from one end of the secondary winding 316 back to the other end of the secondary winding 316 of the transformer 314. The balance choke 360 comprising the first winding 362 and the second winding 364 can be used to balance the current flowing through the first branch 352 and the current flowing through the second branch 354.

In accordance with one embodiment of the present invention, the first winding 362 and the second winding 364 of the balance choke 360 have the same number of turns and they are wound on the same magnetic core. As such, the current flowing through the first winding 362 is substantially equal to the current flowing through the second winding 364. Since the CCFL 342 is coupled to the first winding 362 of the balance choke 360 in series and the CCFL 344 is coupled to the second winding 364 of the balance choke 360 in series, the current flowing through the CCFL 342 is substantially equal to the current flowing through CCFL 344. Similarly, the current flowing through the CCFL 346 is substantially equal to the current flowing through the CCFL 348. In other words, the currents flowing through the four CCFLs 342, 344, 346, and 348 are substantially equal to each other, and the individual brightness of the four CCFLs 342, 344, 346 and 348 can be kept the same.

In accordance with one embodiment of the present invention, the driving circuit 300 comprises a protective circuit 370. The protective circuit 370 is coupled to the second branch 354 for generating a current feedback signal 382. The current feedback signal 382 is transmitted to a controller 380. The current feedback signal 382 is correspondent to the current flowing through the second winding 364 of the balance choke 360. Since the currents flowing through the second winding 364 of the balance choke 360 is substantially equal to the currents flowing through the CCFL 342, 346, 344 and 348, the current feedback signal 382 serves as a current signal correspondent to the currents flowing through the CCFLs 342, 346, 344 and 348.

Referring to FIG. 3, according to one embodiment of the present invention, the protective circuit 370 comprises a first diode 372, a second diode 374, a resistor 376, and a capacitor 378. The two diodes 372 and 374 are coupled with each other in parallel and in opposite directions for coupling the second winding 364 of the balance choke 360 to ground. The capacitor 378 and the resistor 376 are coupled to each other in parallel for coupling the first diode 372 to ground. The CCFL 348 is also coupled to ground. Therefore, when current in a positive direction flows from the CCFL 344 to the protective circuit 370, the current will flow to ground through the first diode 372, the capacitor 378, and the resistor 376. When current in a negative direction flows from the CCFL 348 to ground, the current will flow to the CCFL 344 through the second diode 374. The resistor 376 generates a voltage signal which indicates the current flowing through the second winding 364 so as to form the current feedback signal 382.

The controller 380 is coupled to the switch circuit 310 for controlling the output power or voltage of the switch circuit 310 to a predetermined level. The controller 380 may be adapted to receive the current feedback signal 382 generated from the protective circuit 370 to control the switch circuit 310, and then the current flowing through the CCFL 348 can be controlled to a predetermined level.

In accordance with one embodiment of the present invention, a Pulse Width Modulation (PWM) signal is used to control the current flowing through the CCFLs 342, 344, 346 and 348. The controller 380 generates a set of PWM signals to control the switches, not shown, of the switch circuit 310. The duty cycle of the PWM signals is able to adjust the current flowing through the CCFLs 342, 346, 344 and 348 and hence to adjust the brightness of the CCFLs 342, 346, 344 and 348.

Alternatively, in accordance with another embodiment of the present invention, the voltage of the DC electric power from the electric power source 312 may be adjustable so as to adjust the current flowing through the CCFLs 342, 346, 344 and 348.

Figure 1:
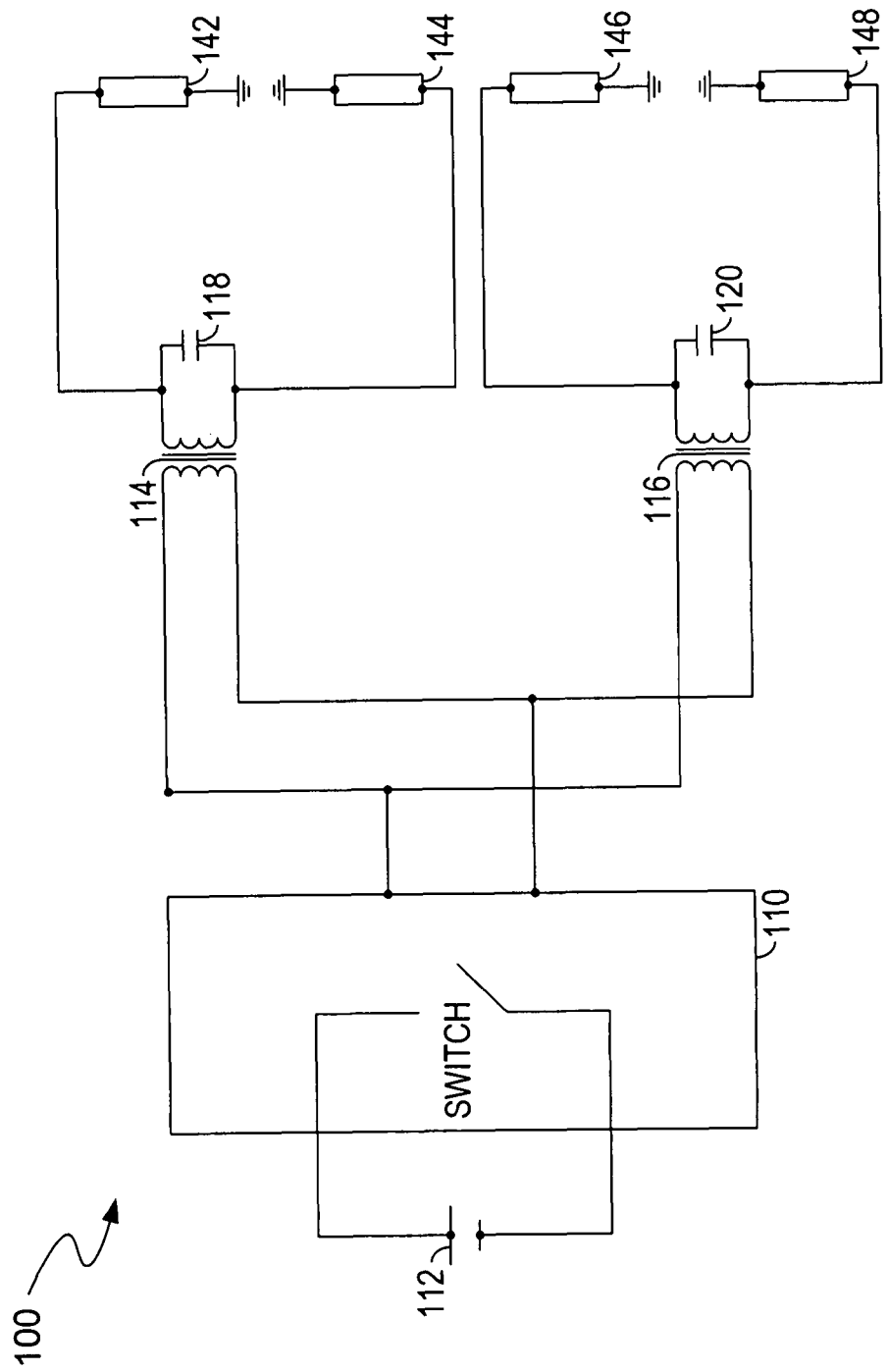
FIG. 1 is a diagram showing a driving circuit for driving four CCFLs in the prior art.
Figure 2:
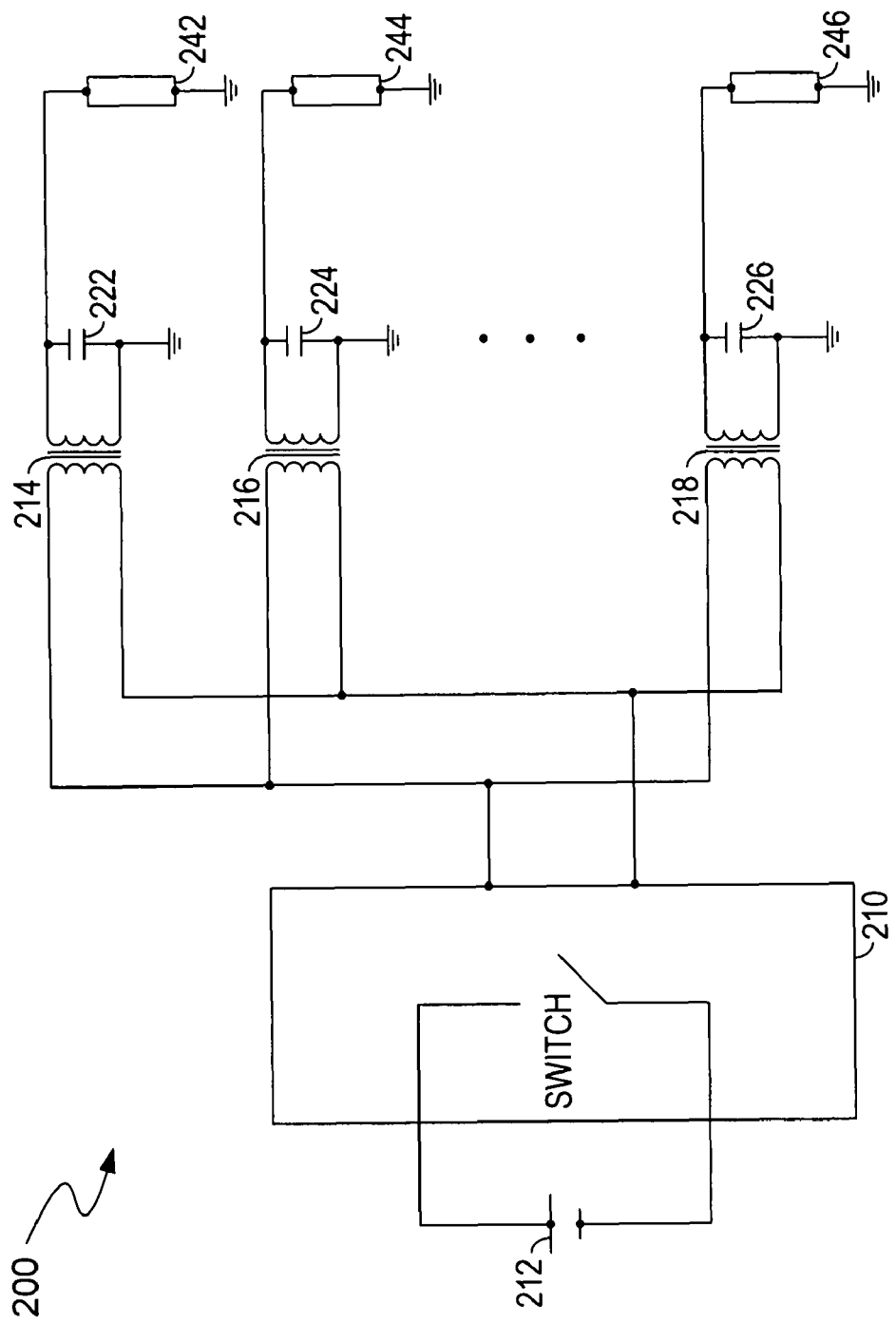
FIG. 2 is a diagram showing a driving circuit for driving a plurality of CCFLs in the prior art.

In the driving circuit 300, only one transformer and one balance choke are used, and the balance of currents among the four CCFLs can be achieved. Furthermore, compared to the topologies shown in PRIOR ART FIG. 1 and PRIOR ART FIG. 2, the number of transformers, MOSFETs, and other R/C components can be reduced. The cost and size of the printed circuit board (PC board) can also be reduced.

Figure 4:
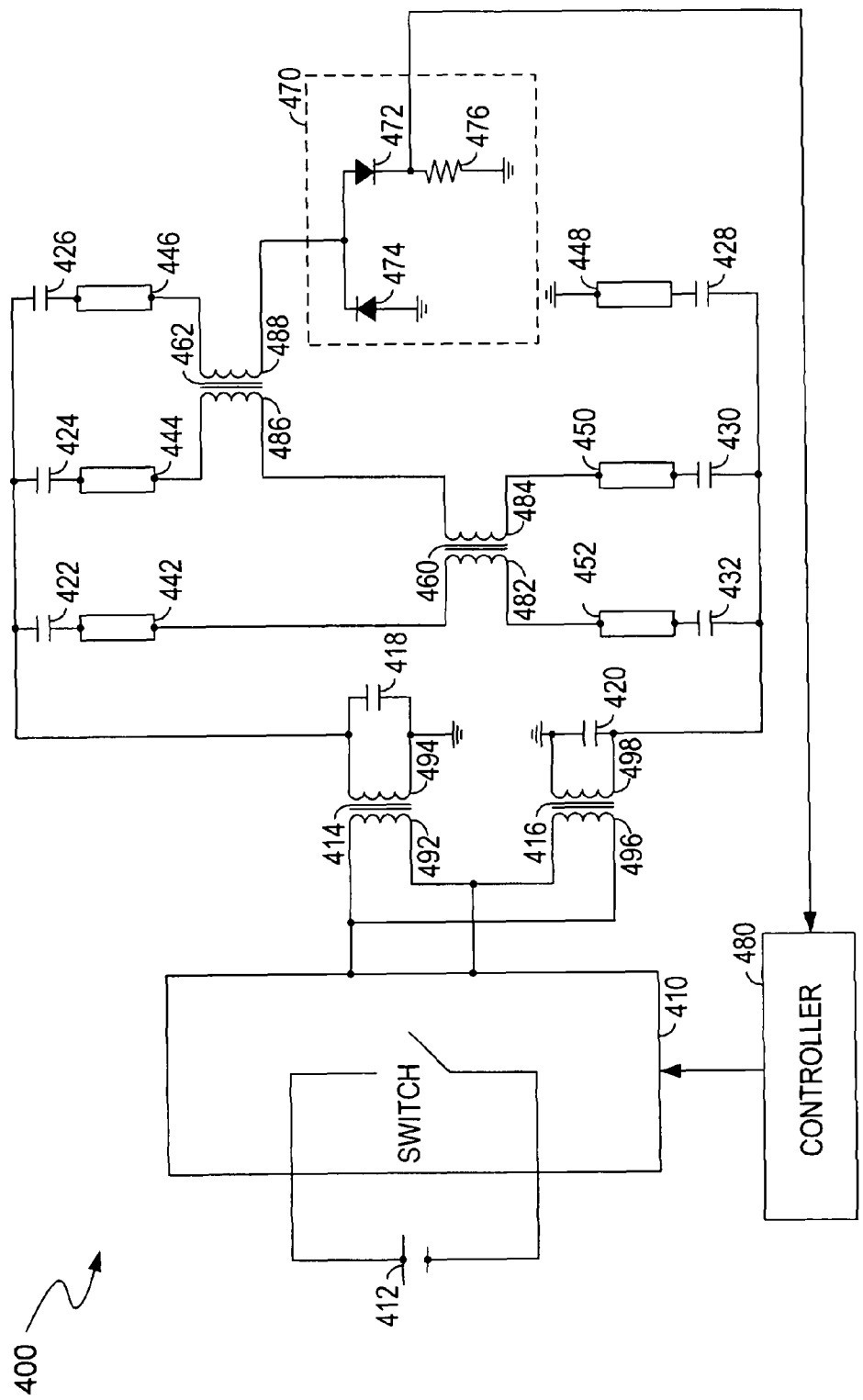
FIG. 4 is a diagram showing a driving circuit for driving six CCFLs, in accordance with one embodiment of the present invention.

FIG. 4 shows a driving circuit 400 according to another embodiment of the present invention is illustrated. In FIG. 4, the driving circuit 400 is used to drive six CCFLs 442, 444, 446, 448, 450, and 452. The driving circuit 400 comprises a switch circuit 410 coupled to a DC electric power source, such as a battery 412. The driving circuit 400 in the FIG. 4 is similar to the driving circuit 300 in the FIG. 3. For clarity, the elements of the driving circuit 400 similar to the elements of the driving circuit 300 discussed in detail above, will not be described hereinafter in detail.

The switch circuit 410 comprises two transformers 414 and 416. The switch circuit 410 is coupled to primary windings 492 and 496 of the transformers 414 and 416 to deliver AC electric power to the transformers 414 and 416. Secondary windings 494 and 498 of the transformers 414 and 416 are coupled to the six CCFLs 442, 444, 446, 448, 450 and 452 to energize the CCFLs 442, 444, 446, 448, 450 and 452. The CCFLs 442 and 452 are coupled with each other in series, and currents flowing through CCFLs 442 and 452 are substantially equal. The CCFLs 444 and 450 are coupled with each other in series, and currents flowing through CCFLs 444 and 450 are substantially equal. The CCFL 446 and 448 are coupled to ground, respectively, and hence currents flowing through CCFLs 446 and 448 are substantially equal. A balance choke 460 comprises a first winding 482 and a second winding 484 which are coupled serially to the CCFLs 442 and 452 and the CCFLs 444 and 450, respectively. As such, the current flowing through the CCFL 442 is substantially equal to the current flowing through the CCFL 444. Similarly, a balance choke 462 comprises a first winding 486 and a second winding 488 coupled in series to the CCFLs 444 and 450 and the CCFLs 446 and 448, respectively. The current flowing through the CCFL 444 is substantially equal to the current flowing through the CCFL 446. Therefore, the currents flowing through the six CCFLs 442, 444, 446, 448, 450 and 452 are substantially equal to each other, and the individual brightness of the six CCFLs 442, 444, 446, 448, 450 and 452 will be kept the same.

In the driving circuit 400, the turns number of the primary windings 492 and 496 of the two transformers 414 and 416 are the same, and turns number of the secondary windings 494 and 498 thereof are also the same. The primary windings 492 and 496 of the transformers 414 and 416 are coupled to each other in parallel. The switch circuit 410 is coupled to both the primary windings 492 and 496 of the transformers 414 and 416. Therefore, the transformers 414 and 416 receives the same level of AC eclectic power from the switch circuit 410. Furthermore, the secondary windings 494 and 498 of the transformers 414 and 416 are in opposite directions. Each of the transformers 414 and 416 supplies half of the total power of the six CCFLs 442, 444, 446, 448, 450 and 452. As such, the maximum current and voltage of the transformers 414 and 416 can be reduced, and the temperature of the transformer 414 and 416 can also be reduced.

Figure 5:
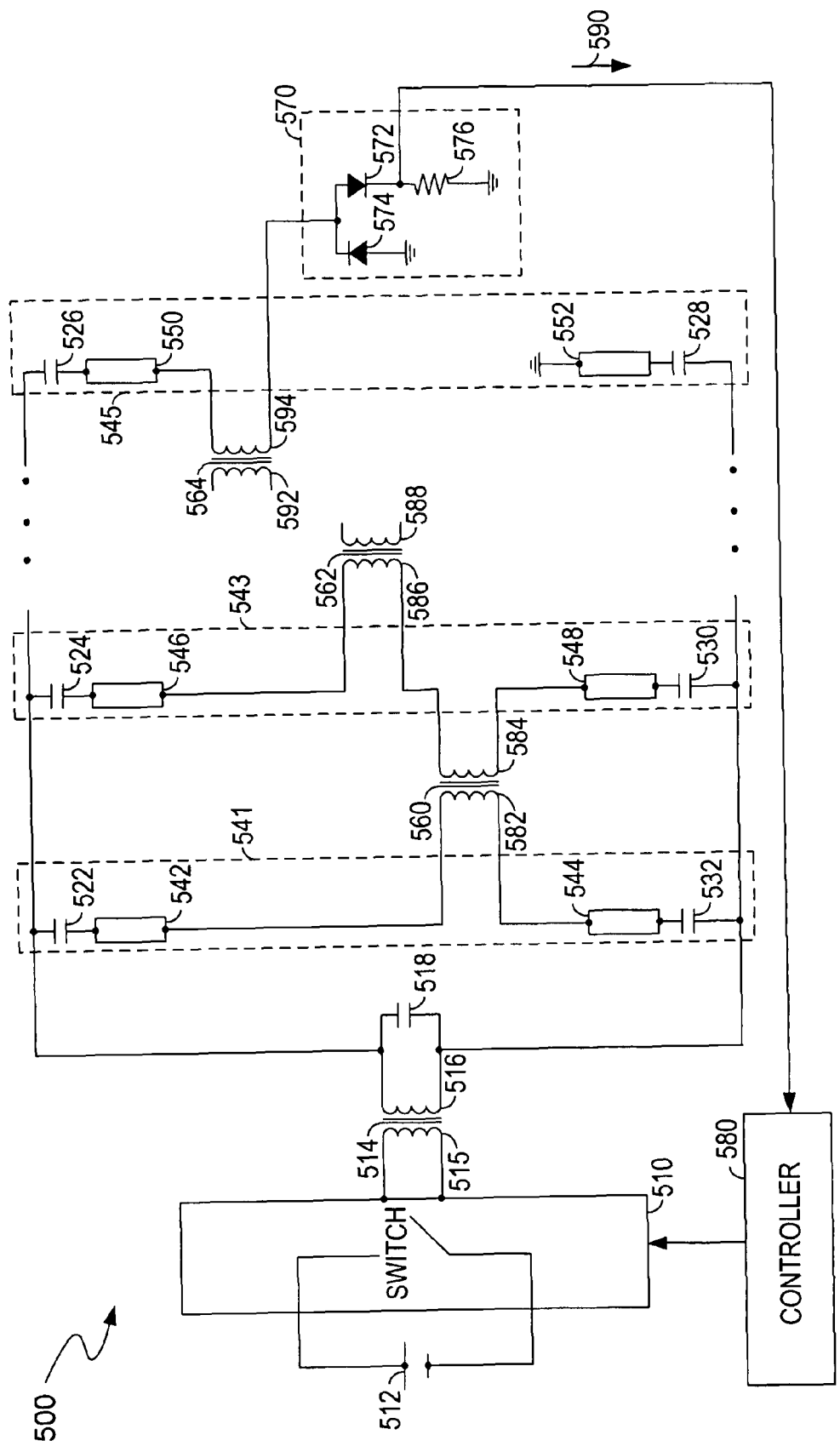
FIG. 5 is a diagram showing a driving circuit for driving a plurality of CCFLs, in accordance with one embodiment of the present invention.

Referring to FIG. 5, a circuit 500 for driving a plurality of CCFLs is illustrated, in accordance with one embodiment of the present invention. In FIG. 5, the driving circuit 500 is used to drive 2N CCFLs 542, 544, 546, 548 ..., 550, and 552. The driving circuit 500 comprises a switch circuit 510 coupled to a DC electric power source, such as a battery 512. The driving circuit 500 in the FIG. 5 is similar to the driving circuit 300 in the FIG. 3. For clarity, the elements of the driving circuit 500 similar to the elements of the driving circuit 300 discussed in detail above will not be described hereinafter in detail.

In one embodiment, the CCFLs shown in FIG. 5 include a first CCFL 542, a second CCFL 544 ..., a $(2N-1)^{th}$ CCFL 550 and a $2N^{th}$ CCFL 552. The 2N CCFLs 542, 544 ..., 550 and 552 are paired to form N CCFL pairs 541, 543, ... and 545. Each of the CCFL pairs 541, 543, ... and 545 has two CCFLs which are coupled to each other in series. In other words, chronologically adjacent two lamps of the 2N CCFLs 542, 544 ..., 550 and 552 beginning with the first CCFL 542 and the second CCFL 544 are coupled in series with each other. As such, the N CCFL pairs 541, 543, ... and 545 of the CCFLs 542, 544 ..., 550 and 552 are formed. For example, the first CCFL 542 and the second CCFL 544 are coupled in series to form the first CCFL pair 541, the third CCFL 546 and the fourth CCFL 548 are coupled in series to form the second CCFL pair 543, and the $(2N-1)^{th}$ CCFL 550 and the $2N^{th}$ CCFL 552 are coupled in series to form the $N^{th}$ CCFL pair 545. The N CCFL pairs 541, 543 ..., and 545 are coupled in parallel with each other. A second AC electric power generated from a secondary winding 516 of a transformer 514 energizes the N CCFL pairs 541, 543, ... and 545 in parallel. N−1 balance chokes 560, 562, ... and 564 each having a first winding and a second winding are used to balance current flowing through the N CCFL pairs 541, 543, ... and 545. For example, the first winding 582 of the first balance choke 560 is serially coupled to the first CCFL pair, which comprises the CCFLs 542 and 544. The second winding 584 of the first balance choke 560 is serially coupled to the second CCFL pair 543, which comprises the CCFLs 546 and 548. The currents flowing through the first CCFL pair 541 and the second CCFL pair 543 are substantially equal with each other. In other words, each of the N−1 balance chokes 560, 562, ... and 564 is used to balance the currents flowing through two of the N CCFL pairs 541, 543, ... and 545. The first winding of the $K^{th}$ balance choke is coupled to the $(2*K-1)^{th}$ CCFL and the $(2*K)^{th}$ CCFL in series, and the second winding of the $K^{th}$ balance choke is coupled to the $(2*K+2)^{th}$ CCFL and the $(2*K+1)^{th}$ CCFL in series. As such, currents flowing through the 2N CCFLs 542, 544 ..., 550 and 552 are substantially equal to each other. The individual brightness of all the 2N CCFLs 542, 544 ..., 550 and 552 will be kept the same.

In addition, the circuits for driving the CCFLs according to the exemplary embodiments of the present invention also apply to other lamps, such as EEFLs.

Figure 6:
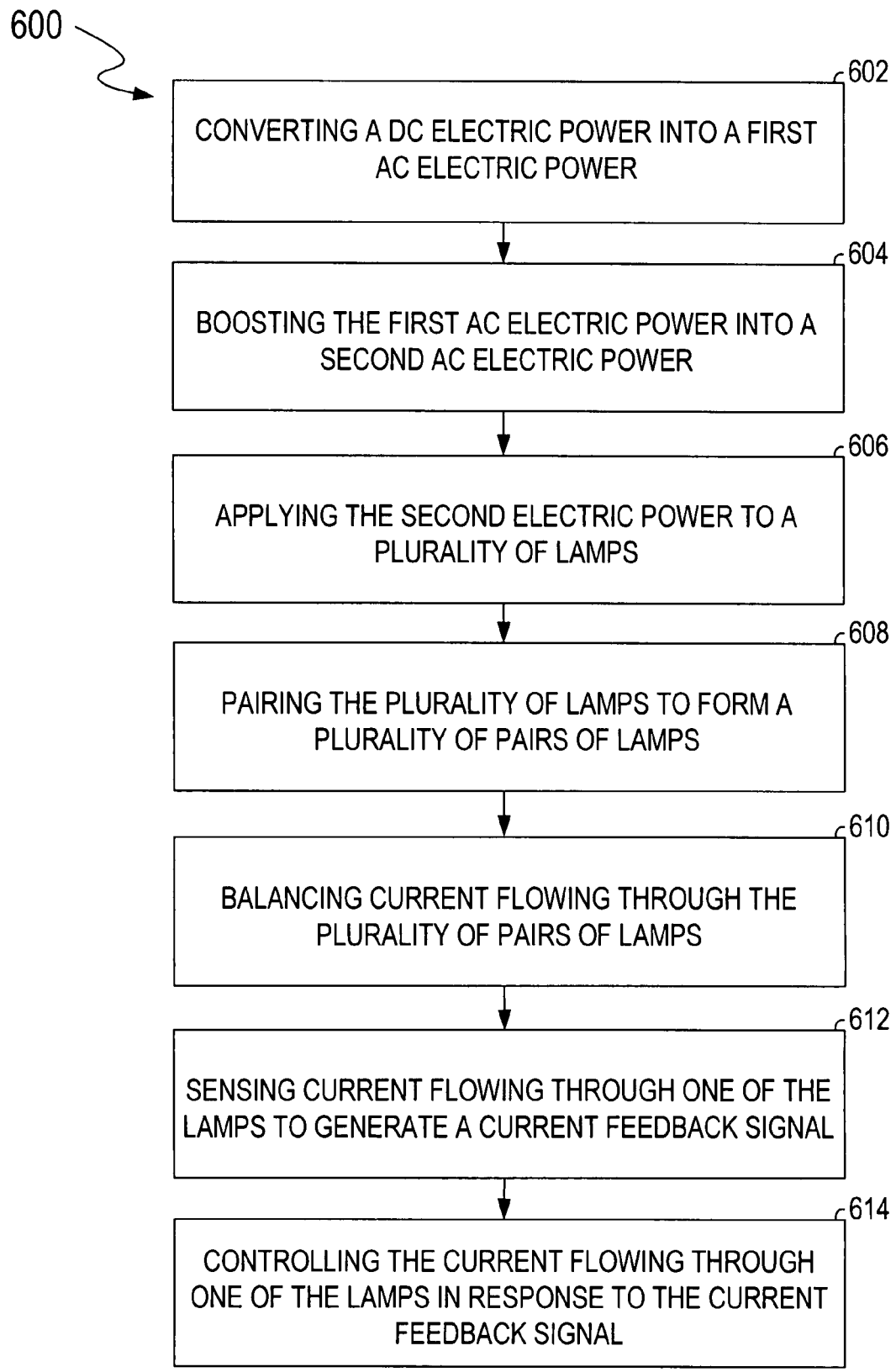
FIG. 6 is a diagram showing a method for driving a plurality of CCFLs, in accordance with one embodiment of the present invention.

Referring to FIG. 6, a method 600 for driving a plurality of cold cathode fluorescent lamps (CCFLs) in an electronic device, such as a liquid crystal display (LCD) panel, according to one embodiment of the present invention is illustrated. At 602, an external DC electric power is converted into a first AC electric power by means of a switch circuit, such as, a Royer, a full-bridge, a half-bridge, or a push-pull inverter circuit architecture.

At 604, the first AC electric power is boosted into a second AC electric power. The second AC electric power has a higher voltage level than that of the first AC electric power and is suitable to light the CCFLs. In one embodiment, the RMS (Root Mean Square) voltage of the second AC electric power is over about 1,000 volts during the ignition period of the CCFLs, and is about 400 to about 800 volts when the CCFL is lighted up. A transformer can be used to boost the first AC electric power into the second AC electric power.

At 606, the second AC electric power is applied to the plurality of CCFLs, which include a first CCFL to a $2N^{th}$ CCFL.

At 608, the CCFLs are paired to form N pairs of CCFLs including a first pair to a $N^{th}$ pair of the CCFLs. Each of the pairs of the CCFLs has two CCFLs which are coupled to each other in series. In other words, the $(2*K-1)^{th}$ CCFL and the $(2*K)^{th}$ CCFL are coupled to each other in series to form the $K^{th}$ pair of CCFLs, where K=1, 2, ... N. Then, the second AC electric power is supplied to the N pairs of CCFLs in parallel.

At 610, currents flowing through the coupled pairs of the CCFLs are balanced. A plurality of balance chokes which include a first to a $(N-1)^{th}$ balance choke each having a first winding and a second winding are used for balancing currents through every pair of CCFLs. In one embodiment, the first and the second windings of each of the balance chokes have the same number of turns, and currents flowing through the first and the second windings are substantially equal with each other. The first winding of the $K^{th}$ balance choke is coupled to the $K^{th}$ pair of CCFLs in series, the second winding of the $K^{th}$ balance choke is coupled to the $(K+1)^{th}$ pair of CCFLs in series, and then currents flowing through the $K^{th}$ pair of CCFLs and the $(K+1)^{th}$ pair of CCFLs are substantially equal with each other, where K=1, 2, N−1. As such, currents flowing through all of the CCFLs are substantially equal with each other.

At 612, current flowing through one of the CCFLs is sensed to generate a current feedback signal. The current feedback signal which is indicative of the current flowing through one of the CCFLs can be used to indicate currents flowing through all the CCFLs, since currents flowing through all of the CCFLs are substantially equal with each other. In accordance with one embodiment of the present invention, a protective circuit comprising a resistor and two diodes can be used to sense the current and generate the current feedback signal.

At 614, the first AC electric power is controlled so as to control the currents flowing through the CCFLs to a predetermined level in response to a current feedback signal. A controller is used to receive the current feedback signal and control the first AC electric power to a predetermined level in response to the current feedback signal such that the currents flowing through the CCFLs can be controlled to a predetermined level. As such, the brightness of the CCFLs can be controlled or dimmed to a predetermined level, and stabilized.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A circuit for driving a plurality of lamps including a first to a $2N^{th}$ lamp, wherein N is an integer and at least 2, comprising:
   a switch circuit operable for converting an external DC electric power into a first AC electric power;
   a first transformer having a primary winding and a secondary winding, wherein said primary winding of said first transformer is coupled to said switch circuit and is operable for receiving said first AC electric power and for energizing said secondary winding of said first transformer so as to generate a second AC electric power from said secondary winding of said first transformer to energize said plurality of lamps;
   a second transformer having a primary winding and a secondary winding, wherein said primary winding of said second transformer is coupled to said primary winding of said first transformer in parallel and is operable for receiving said first AC electric power and for energizing said secondary winding of said second transformer, wherein said secondary winding of said second transformer is coupled to said secondary winding of said first transformer in series so as to generate a third AC electric power from said secondary winding of said second transformer to energize said plurality of lamps; and
   a plurality of balance chokes including not more than (N−1) balance chokes, each of said balance chokes having a first winding and a second winding, wherein said plurality of lamps are paired to form a plurality of pairs of lamps, wherein each of said pairs of lamps comprises a first lamp and a second lamp which are coupled to each other in series, and wherein said first winding and said second winding of a $K^{th}$ balance choke are coupled between two lamps of a $K^{th}$ pair of said pairs of lamps in series and between two lamps of a $(K+1)^{th}$ pair of said pairs of lamps in series, respectively, so as to balance currents flowing through said plurality of lamps, wherein K=1, 2, . . . , (N−1), wherein each of said pairs of lamps further comprises a first capacitor coupled between said first transformer and said first lamp, and a second capacitor coupled between said second transformer and said second lamp, wherein said first capacitor, said first lamp, said second lamp and said second capacitor are coupled in series, wherein said first capacitor has a first end directly connected to said secondary winding of said first transformer and has a second end directly connected to said first lamp, and wherein said second capacitor has a first end directly connected to said secondary winding of said second transformer and a second end directly connected to said second lamp.

2. The circuit as claimed in claim 1, further comprising:
   a protective circuit coupled to said first lamp for sensing current flowing through said first lamp.

3. The circuit as claimed in claim 2, further comprising:
   a controller for controlling said switch circuit in response to said sensed current flowing through said first lamp to adjust said current flowing through said first lamp to a predetermined level.

4. The circuit as claimed in claim 2, wherein said protective circuit comprises:
   a first diode for coupling said first lamp to ground;
   a second diode coupled in parallel with said first diode in an opposite direction; and
   a resistor coupled in series with said first diode such that voltage across said resistor is representative of said current flowing through said first lamp.

5. The circuit as claimed in claim 1, wherein said switch circuit is a full-bridge circuit.

6. The circuit as claimed in claim 1, wherein said switch circuit is a half-bridge circuit.

7. The circuit as claimed in claim 1, wherein said switch circuit is a push-pull circuit.

8. The circuit as claimed in claim 1, wherein said switch circuit is a Royer circuit.

9. The circuit as claimed in claim 1, wherein said first and said second windings of each of said balance chokes have the same number of turns, such that said currents flowing through said plurality of lamps are substantially equal.

10. The circuit as claimed in claim 1, wherein said plurality of lamps comprises a plurality of cold cathode fluorescent lamps (CCFLs).

11. The circuit as claimed in claim 1, wherein said first capacitor, said first lamp, a balance choke, said second lamp, and said second capacitor are coupled in that order between said first transformer and said second transformer.

12. A method for driving a plurality of lamps including a first to a $2N^{th}$ lamp, wherein N is an integer and at least 2, comprising:
   converting an external DC electric power into a first AC electric power using a switch circuit;
   boosting said first AC electric power into a second AC electric power using a first transformer having a primary winding and a secondary winding, wherein said primary winding of said first transformer receives said first AC electric power and energizes said secondary winding of said first transformer so as to generate said second AC electric power from said secondary winding of said first transformer to energize said plurality of lamps;
   boosting said first AC electric power into a third AC electric power using a second transformer having a primary winding and a secondary winding, wherein said primary winding of said second transformer is coupled to said primary winding of said first transformer in parallel for receiving said first AC electric power and energizing said secondary winding of said second transformer, wherein said secondary winding of said second transformer is coupled to said secondary winding of said first transformer in series so as to generate said third AC electric power from said secondary winding of said second transformer to energize said plurality of lamps;
   applying said second AC electric power to said plurality of lamps;
   pairing said plurality of lamps to form a plurality of pairs of lamps and coupling a first lamp and a second lamp in each of said pairs of lamps to each other in series;
   stabilizing current of each pair of said pairs of lamps by a first capacitor and a second capacitor, wherein said first capacitor has a first end directly connected to said secondary winding of said first transformer and has a second end directly connected to said first lamp, and wherein said second capacitor has a first end directly connected to said secondary winding of said second transformer and a second end directly connected to said second lamp; and
   balancing currents flowing through said pairs of lamps using a plurality of balance chokes including not more than (N−1) balance chokes, each of said balance chokes having a first winding and a second winding, wherein said first winding and said second winding of a $K^{th}$ balance choke are coupled between two lamps of a $K^{th}$ pair of said pairs of lamps in series and between two lamps of a $(K+1)^{th}$ pair of said pairs of lamps in series, respectively, wherein K=1, 2, . . . , (N−1).

13. The method as claimed in claim 12, wherein said first and said second windings of each of said balance chokes have the same number of turns.

14. The method as claimed in claim 12, further comprising:
sensing current flowing through said first lamp to generate a current feedback signal.

15. The method as claimed in claim 14, further comprising:
controlling said current flowing through said first lamp in response to said current feedback signal.

16. The method as claimed in claim 12, wherein said plurality of lamps comprises a plurality of cold cathode fluorescent lamps (CCFLs).

17. A display system, comprising:
a liquid crystal display (LCD) panel;
a plurality of lamps including a first to a $2N^{th}$ lamp for operable for illumining said LCD panel, wherein N is an integer and at least 2;
a switch circuit operable for converting an external DC electric power into a first AC electric power;
a first transformer having a primary winding and a secondary winding, wherein said primary winding of said first transformer is coupled to said switch circuit and is operable for receiving said first AC electric power and for energizing said secondary winding of said first transformer so as to generate a second AC electric power from said secondary winding of said first transformer to energize said plurality of lamps;
a second transformer having a primary winding and a secondary winding, wherein said primary winding of said second transformer is coupled to said primary winding of said first transformer in parallel and is operable for receiving said first AC electric power and for energizing said secondary winding of said second transformer, wherein said secondary winding of said second transformer is coupled to said secondary winding of said first transformer in series so as to generate a third AC electric power from said secondary winding of said second transformer to energize said plurality of lamps; and
a plurality of balance chokes including not more than (N−1) balance chokes, each of said balance chokes having a first winding and a second winding, wherein said plurality of lamps are paired to form a plurality of pairs of lamps, wherein each of said pairs of lamps comprises a first lamp and a second lamp which are coupled to each other in series, and wherein said first winding and said second winding of a $K^{th}$ balance choke are coupled between two lamps of a $K^{th}$ pair of said pairs of lamps in series and between two lamps of a $(K+1)^{th}$ pair of said pairs of lamps in series, respectively, so as to balance currents flowing through said plurality of lamps, wherein K=1, 2, . . . , (N−1), wherein each of said pairs of lamps further comprises a first capacitor coupled between said first transformer and said first lamp, and a second capacitor coupled between said second transformer and said second lamp, wherein said first capacitor, said first lamp, said second lamp and said second capacitor are coupled in series, wherein said secondary winding of said first transformer is coupled to a first end of said first lamp via said first capacitor, a second end of said first lamp is coupled to a second end of said second lamp via a first balance choke, and a first end of said second lamp is coupled to said secondary winding of said second transformer via said second capacitor.

18. The display system as claimed in claim 17, further comprising:
a protective circuit coupled to said first lamp for sensing current flowing through said first lamp.

19. The display system as claimed in claim 18, further comprising:
a controller for controlling said switch circuit in response to said sensed current flowing through said first lamp to adjust said current flowing through said first lamp to a predetermined level.

* * * * *